(12) United States Patent
Breeden, III et al.

(10) Patent No.: US 7,131,608 B2
(45) Date of Patent: Nov. 7, 2006

(54) RETAIL PACKAGE FOR WINDING AND STORAGE OF STRAPS

(75) Inventors: Winston H. Breeden, III, Chagrin Falls, OH (US); Bob Johnson, Montville, OH (US)

(73) Assignee: Winston Products, LLC, Cleveland, OH (US)

( * ) Notice: Subject to any disclaimer, the term of this patent is extended or adjusted under 35 U.S.C. 154(b) by 28 days.

(21) Appl. No.: 11/031,734

(22) Filed: Jan. 7, 2005

(65) Prior Publication Data

US 2005/0145747 A1    Jul. 7, 2005

Related U.S. Application Data

(60) Provisional application No. 60/534,842, filed on Jan. 7, 2004.

(51) Int. Cl.
*B65H 75/30* (2006.01)

(52) U.S. Cl. ............... 242/395; 242/388.6; 242/405.3; 242/397

(58) Field of Classification Search ............... 242/395, 242/397, 405, 405.3, 395.1, 588.3, 588.6, 242/129, 530, 530.1, 530.3, 388.7, 388.8, 242/388.6, 388, 587.2; 206/389, 391, 393, 206/394, 397
See application file for complete search history.

(56) References Cited

U.S. PATENT DOCUMENTS

| 2,918,342 | A | * | 12/1959 | Tarte, Jr. | ............... | 312/348.3 |
| 2,954,942 | A | * | 10/1960 | La Raus | ............... | 242/129 |
| 3,485,458 | A | * | 12/1969 | Evans | ............... | 242/129 |
| 3,937,414 | A | * | 2/1976 | Bank et al. | ............... | 242/557 |
| 5,193,680 | A | * | 3/1993 | Schumann et al. | ...... | 242/423.1 |
| 6,502,783 | B1 | * | 1/2003 | Smith et al. | ............... | 242/530.3 |
| 6,612,436 | B1 | * | 9/2003 | Zullo | ............... | 206/391 |

* cited by examiner

*Primary Examiner*—John Q. Nguyen
*Assistant Examiner*—William E. Dondero
(74) *Attorney, Agent, or Firm*—Calfee, Halter & Griswold LLP

(57) ABSTRACT

A case for storing and winding a plurality of ratchet tie-downs removable from the case for use. The case includes a base having a plurality of compartments for storing first parts of the tie-downs. A plurality of reels are supported on the base for rotation relative to the base, each reel having a winding portion for winding a strap on the reel. The case includes a rotation mechanism for simultaneously rotating all the reels in a winding direction relative to the base thereby to wind the straps onto the reels. The case includes a lid for the case, the lid when in a closed position helping to retain the straps in the case. The case has a closed configuration adapted for placement on a retail store shelf and the lid having an exterior major side surface for holding retail information.

15 Claims, 10 Drawing Sheets

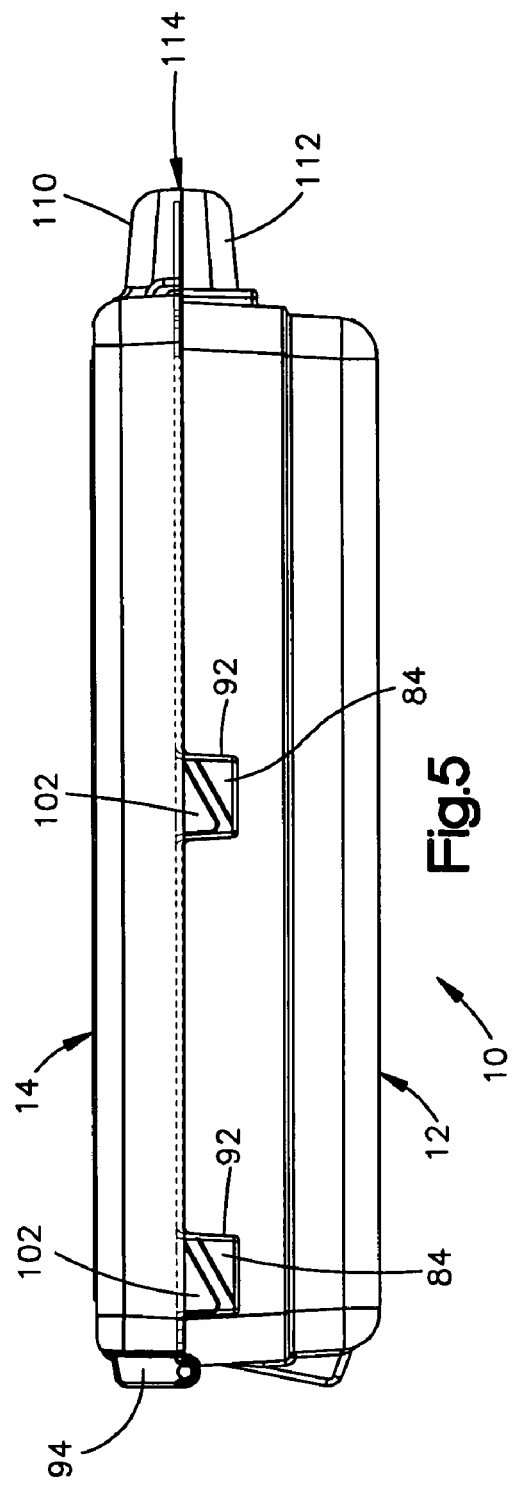
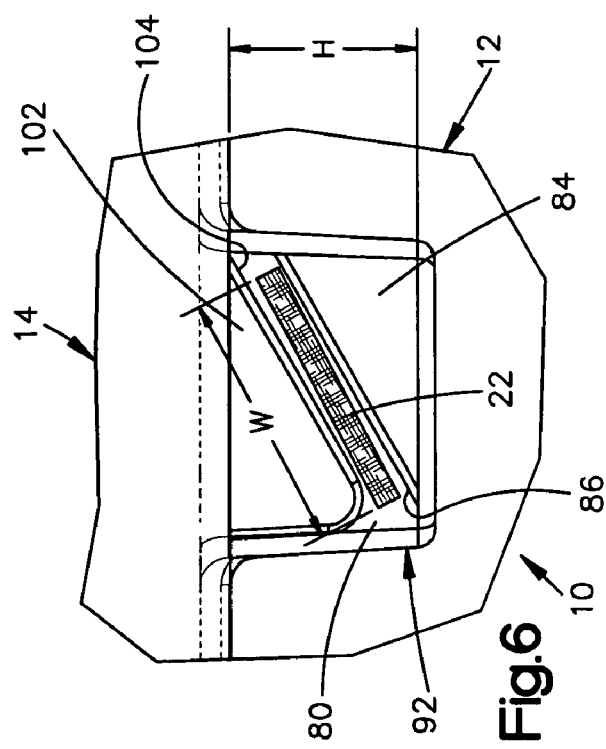

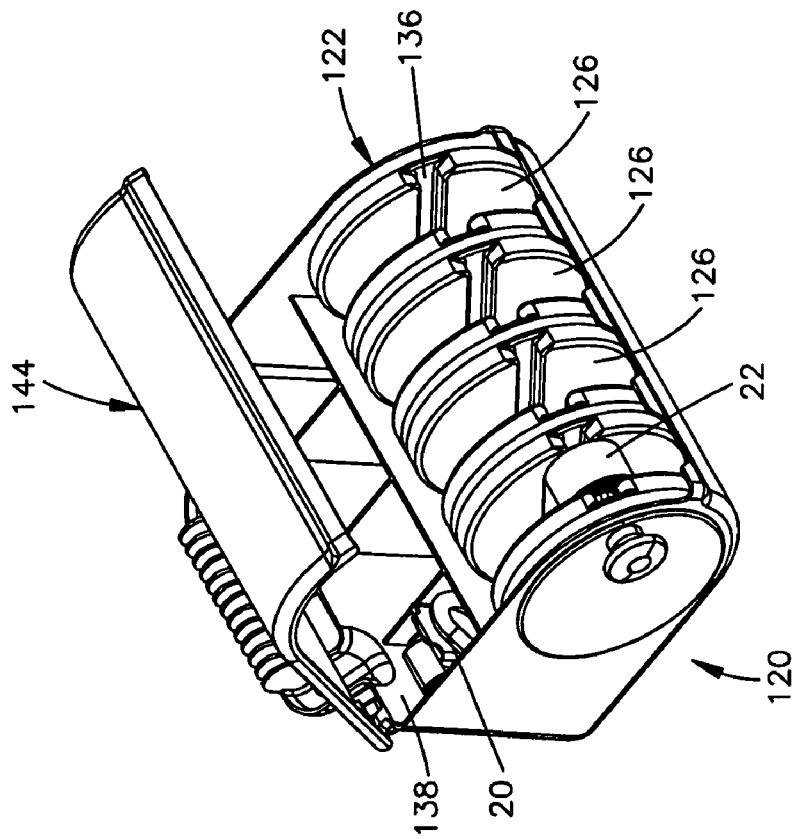
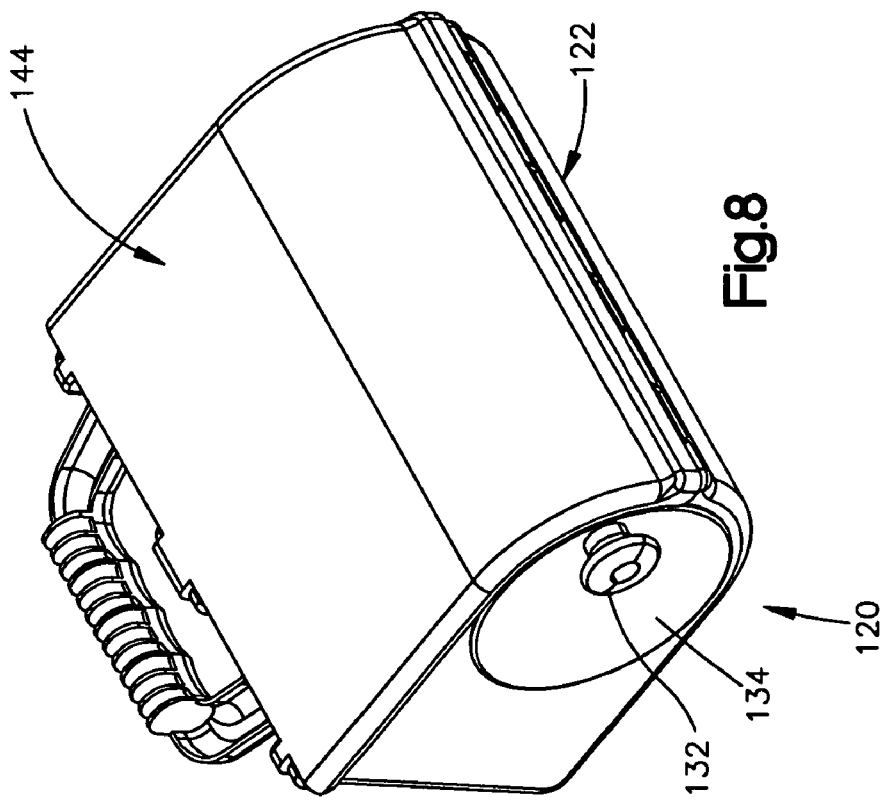

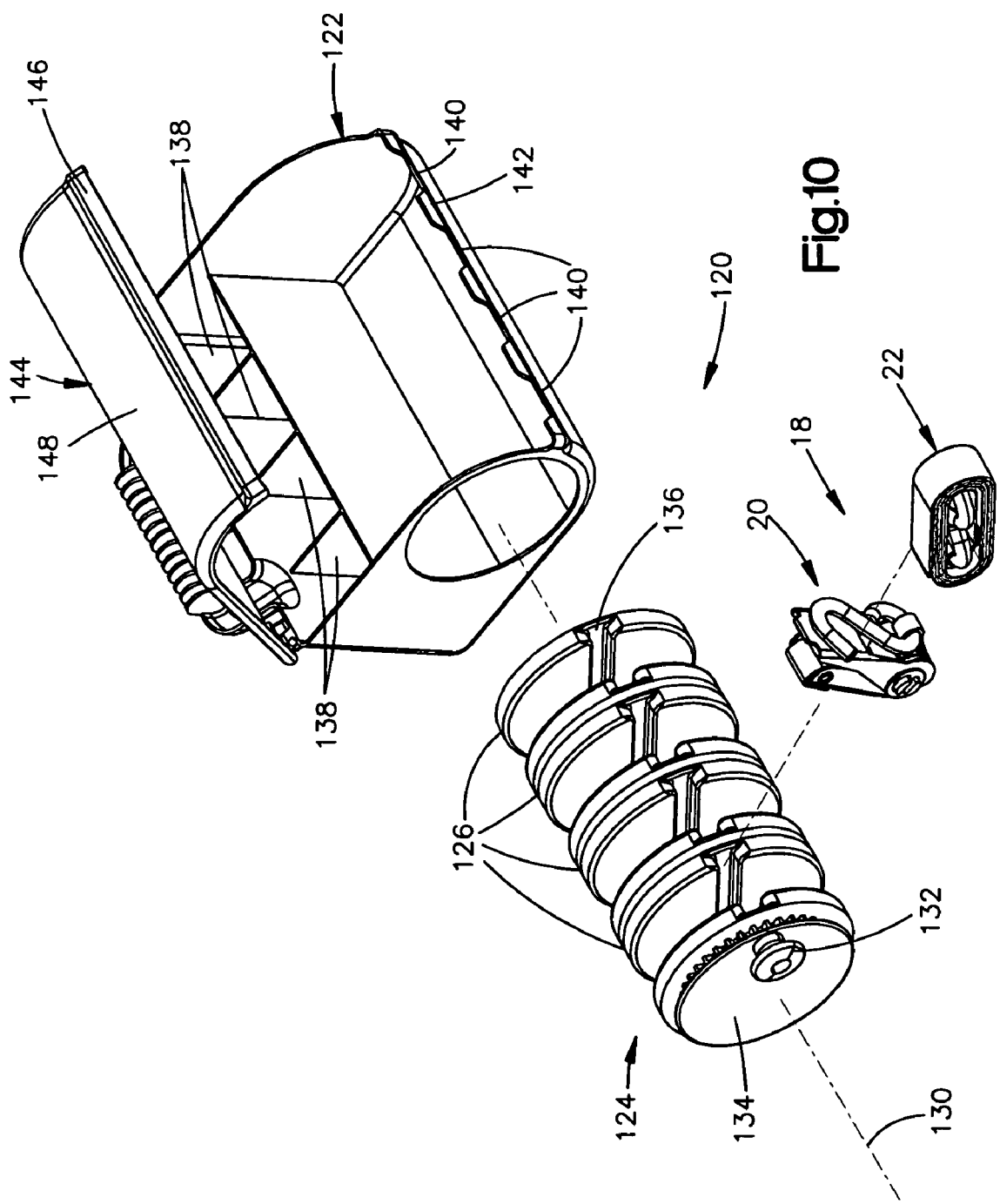

RETAIL PACKAGE FOR WINDING AND STORAGE OF STRAPS

RELATED APPLICATION

This application claims the benefit of U.S. Provisional Application No. 60/534,842, filed Jan. 7, 2004, the disclosure of which is incorporated by reference.

BACKGROUND OF THE INVENTION

1. Technical Field

The present invention relates to a retail package, or case, for winding, and storage of straps. In particular, the present invention relates to a case that is adapted to wind and store a plurality of straps, such as ratchet tie-downs, and that is also adapted as a retail package.

2. Description of the Prior Art

Items such as ratchet tie-downs are commonly used to secure snowmobiles, etc. A ratchet tie-down includes a ratchet assembly and a strap.

When a ratchet tie-down is displayed at retail, it is typically neatly packaged, but the packaging is thrown away once it is opened. When the tie-down is thereafter not in use, the strap is loose and unwound. If several are being used, they can be messy and can get dirty or tangled in, for example, the bed of a pickup truck.

SUMMARY OF THE INVENTION

In one aspect the invention relates to a case for storing and winding a plurality of ratchet tie-downs each having a first part and having a second part, the second part of each tie-down including a strap having a hook at one end, the tie-downs being removable from the case for use. The case includes a base having a plurality of compartments for storing the first parts of the tie-downs. A plurality of reels are supported on the base for rotation relative to the base, each reel having a winding portion for winding the strap on the reel upon rotation of the reel. The case includes a rotation mechanism for simultaneously rotating all the reels in a winding direction relative to the base thereby to wind the straps onto the reels. The case includes a lid for the case, the lid when in a closed position helping to retain the straps in the case, the lid also having an open position relative to the base for enabling removal of the straps from the reels. The case has a closed configuration adapted for placement on a retail store shelf and the lid having an exterior major side surface for holding retail information.

In another aspect, the invention relates to a case for winding a plurality of straps that are removable from the case for use. The case includes a base, and a plurality of reels supported on the base for rotation relative to the base about respective reel axes, each reel having a receiving portion for receiving an end portion of a strap and having a winding portion for winding the strap on the reel upon rotation of the reel about its axis, each reel also having a reel gear. A main gear is supported on the base for rotation relative to the base about a main gear axis separate from the reel axes, the main gear being in meshing engagement with the reel gears. A manually engageable handle is connected with the main gear for transmitting rotational force to the main gear thereby to cause rotation of the reels about their reel axes.

In still another aspect, the invention relates to a case for winding a plurality of straps that are removable from the case for use. The case includes a base, and a plurality of reels supported on the base for rotation relative to the base about respective reel axes, each reel receiving an end portion of a strap and having a winding portion for winding the strap on the reel upon rotation of the reel about its axis. The case includes a mechanism for simultaneously rotating all the reels on the base thereby to wind the straps onto the reels. A lid for the base has an open position relative to the base for removing the straps from the reels, the lid having a closed position relative to the base in which guide portions of the lid are disposed adjacent to and cooperate with guide portions of the base to guide the straps onto the winding portions of the reels as the reels are being rotated about the reel axes.

BRIEF DESCRIPTION OF THE DRAWINGS

The foregoing and other features of the invention will become apparent to one of ordinary skill in the art to which the invention pertains from a reading of the following description in conjunction with the accompanying drawings, in which:

FIG. 5 is an elevational view of the case of FIG. 1, showing two guide openings;

FIG. 6 is an enlarged view of one of the guide openings of the case;

FIG. 8 is a perspective view of a case in the form of a spool winder that is a second embodiment of the invention, shown in a closed condition;

FIG. 9 is a view showing the case of FIG. 8 in an open condition with one ratchet tie-down therein;

FIG. 10 is an exploded perspective view of the parts of the case of FIG. 8;

DETAILED DESCRIPTION

Figure 1:
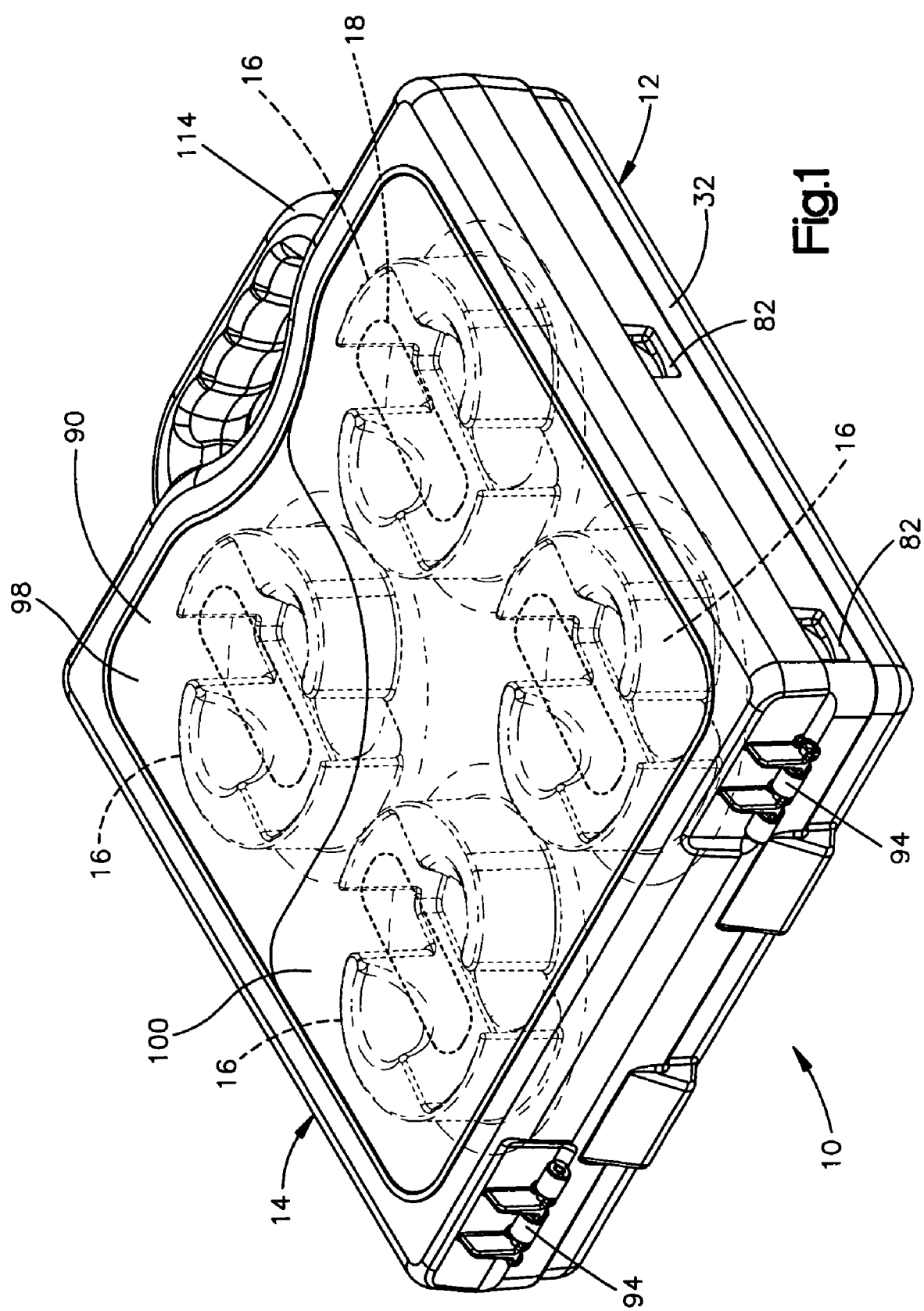
FIG. 1 is a perspective view of a case that is a first embodiment of the invention, shown in a closed condition, and showing in phantom four reels for winding the straps of ratchet tie-downs.

The present invention relates to a retail package, or case, for winding and storage of straps. In particular, the present invention relates to a case that is adapted to wind and store a plurality of ratchet tie-downs including straps, and that is also adapted as a retail package. The invention is applicable to cases of varying and different constructions. As representative of the invention, FIG. 1 illustrates a case 10 that is a first embodiment of the invention.

The case 10 includes a base 12, a lid 14 for the base, and a plurality of reels 16 on the base. The case 10 has a rectangular box-shaped configuration that is adapted to hold, in this instance, four ratchet tie-downs 16 in a wound condition on the reels 16.

Figure 7:
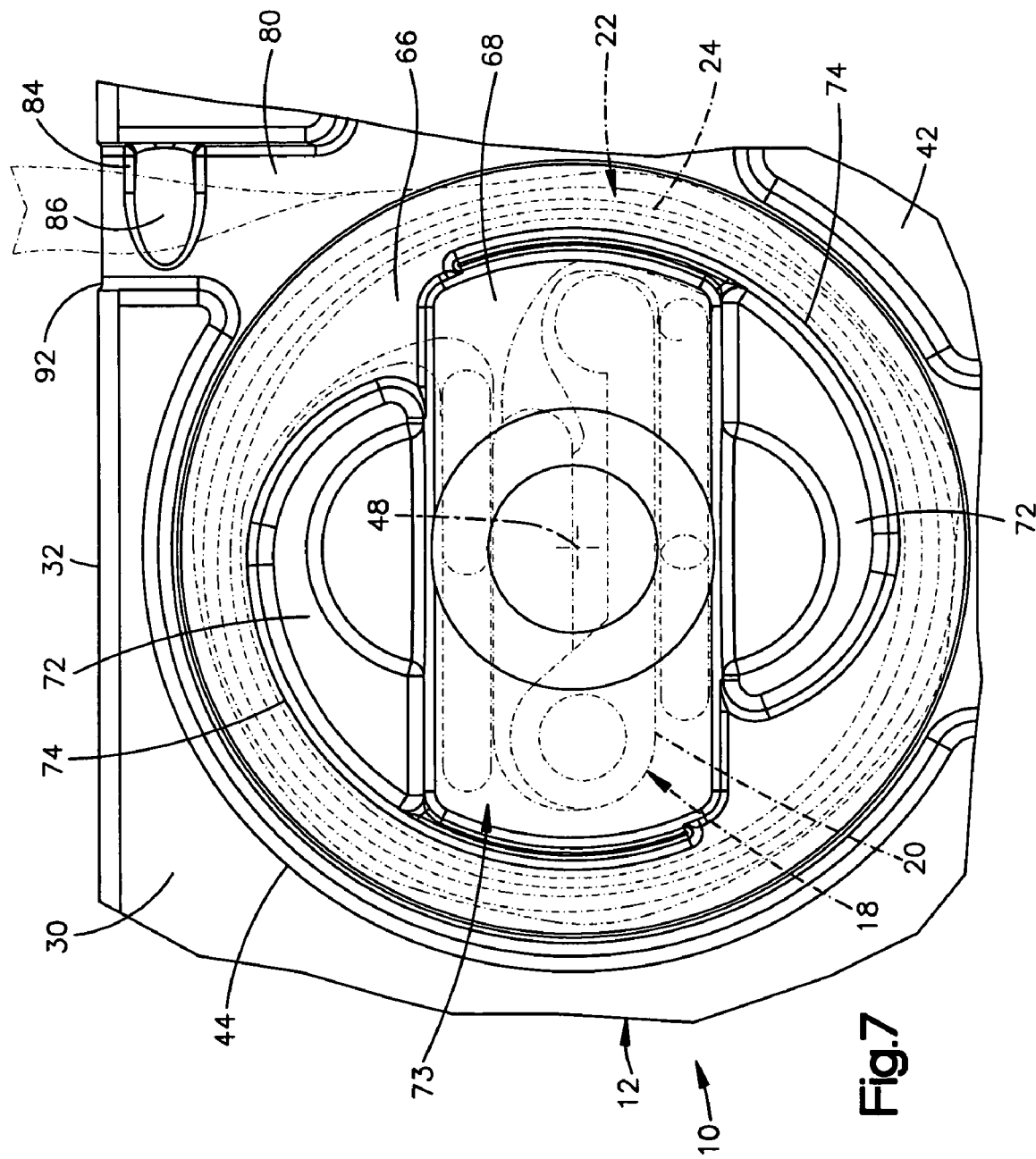
FIG. 7 is an enlarged top plan view showing a ratchet tie-down associated with one of the reels.

The particular case 10 that is illustrated is adapted to package and display at retail, wind, and store four ratchet tie-downs 18 that are identical to each other. The particular ratchet tie-downs 18 shown each include a metal base or ratchet assembly 20 that includes a first hook. Each tie-down 18 also includes a strap 22 that is preferably a length of webbing with a second hook at one end and an opposite free end. The ratchet tie-down is used by inserting the free end of the strap 22 into the ratchet 20. Each strap 22 is long enough so that, when stored in the case, it forms a plurality of layers or windings 24, as shown in FIG. 7.

The base 12 of the case 10 includes a generally planar bottom wall 30 and four side walls 32. The bottom wall 30 has an inner major side surface 34 and an outer major side surface 36. The bottom wall 30 has on its outer major side surface 36 a circular main gear recess 38 centered on a central axis 40 of the case 10.

The bottom wall 30 of the base 20 on its inside is formed with a central boss 42 between four circular reel recesses 44. In the center of each reel recess 44 is a mounting flange 46 for receiving and securing in position a reel 16. Each mounting flange 46 and reel recess 44 as a whole is centered on a respective reel axis 48. In the illustrated embodiment, there are four reel recesses 44, centered on four reel axes 48, spaced equally about the central axis 40.

At the outer edge of each reel recess 44 (near the central boss 42) the bottom wall 30 of the base 12 has a gear access opening 50 that extends between the inner side surface 34 and the outer side surface 36 of the bottom wall. There are thus four gear access openings 50 in the bottom wall 30 of the base 12.

The case 10 includes a main gear 52 that is received in the main gear recess 38. The main gear 52 is a disc-shaped member having a recessed central portion 54 secured to the bottom wall 30 of the base 12 by a mounting flange 56 of the base 12. As thus secured, the main gear 52 is rotatable relative to the base 12 about the central axis 40 of the case 10.

Figure 3:
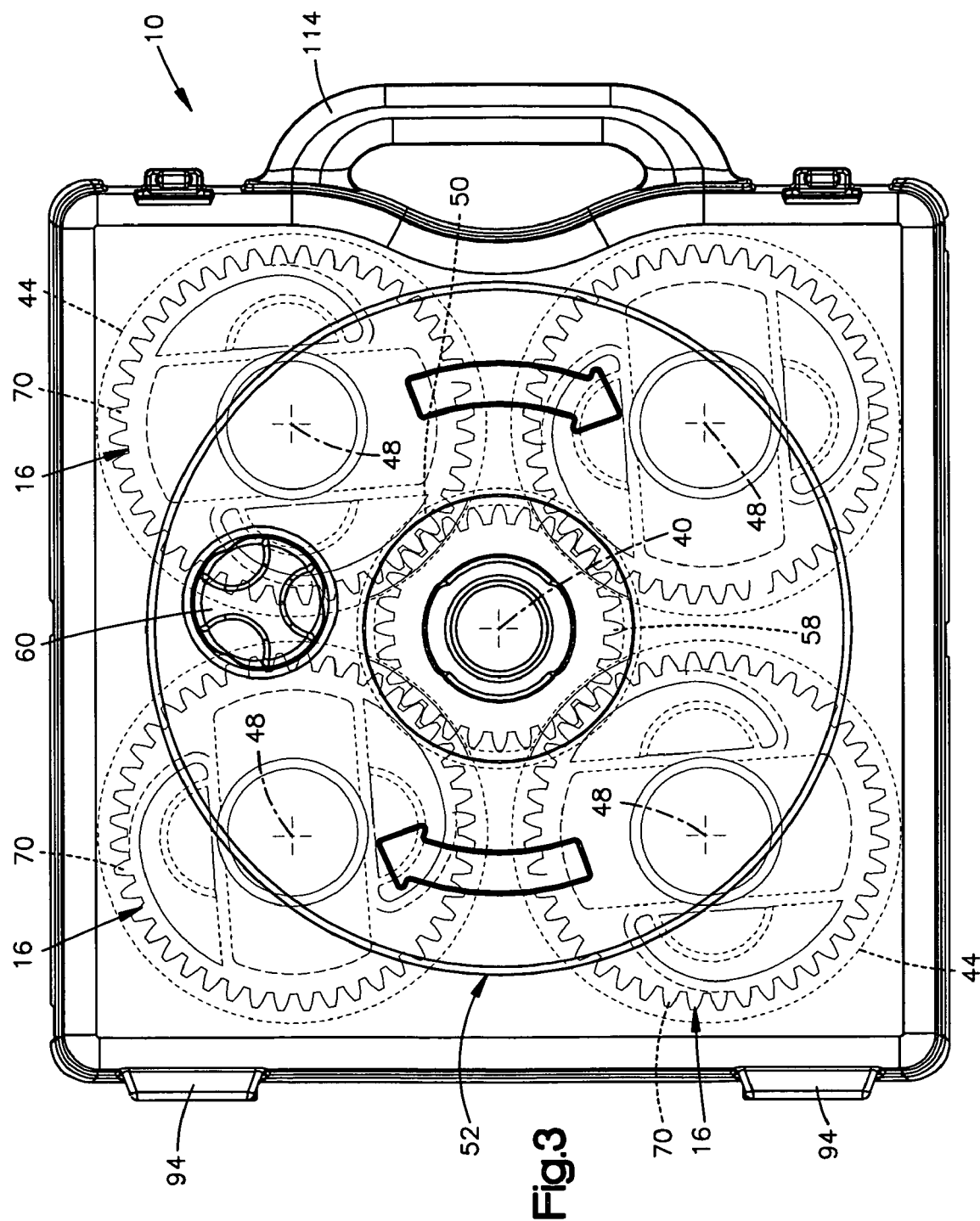
FIG. 3 is a schematic illustration of the case of FIG. 1, showing the four internal reels and a gear for winding the reels.
Figure 4:
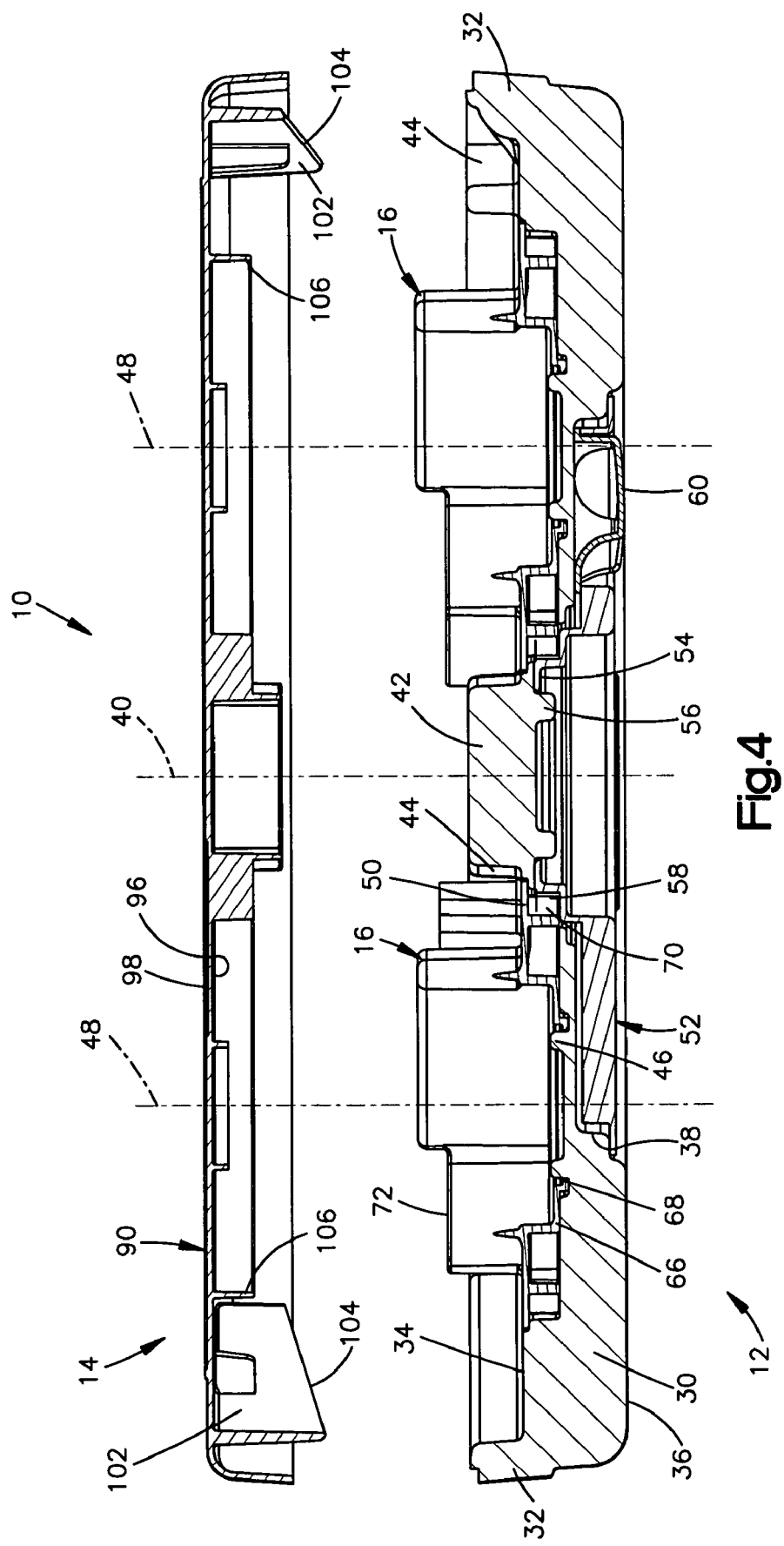
FIG. 4 is an exploded view through the case of FIG. 1.

The main gear 52 has on its inner surface, near the axis 40, a set of gear teeth 58 (FIG. 3) centered on the axis 40. The gear teeth 58 are located inside the base 12, that is, inside the inner side surface 34 of the bottom wall 30 of the base. The gear teeth 58 are thus accessible from the inside of the base 12. Specifically, the gear teeth 58 project into and are accessible in all of the gear access openings 50 in the reel recesses 44.

The main gear 52 also has, closer to its periphery, a circular handle opening within which a handle 60 is rotatably secured to the main gear. The handle 60 preferably is configured for easy gripping and rotation, for example, with the three-armed shape shown. The handle 60 is used to rotate the main gear 52 about the central axis 40, as described below.

The four reels 16 in the illustrated case are identical to each other and are associated one with each reel recess 44. Each reel 16 has an annular base plate 66 with a central opening 68. The opening 68 receives the mounting flange 46 in the reel recess 44, to rotatably secure the reel 16 to the bottom wall 30 of the base 12. On the bottom of the base plate 66 is a circular gear 70. The gear 70 on the reel 16 meshes with the gear teeth 58 on the main gear 52.

Each reel 16 has upstanding wall portions 72 for retaining the ratchet assembly 20 of one of the ratchet tie-downs 18, as well as the second hook. The wall portions 72 are configured to form compartments 73 for retaining the particular ratchet tie-down 18 being stored and wound; other reel configurations could be provided for other ratchet tie-downs. The wall portions 72 have outer side surfaces that are configured as portions of a cylindrical winding surface 74 on which the strap 22 can be wound. The winding surface 74 is centered on the reel axis 48.

The base 12 of the case 10 also includes guide portions for guiding the straps 22 as they are being wound on the reels 16 as described below. In the illustrated embodiment, the guide portions include passages 80 in the base 12 that are associated in a one to one relationship with the reels 16. Each passage 80 extends generally tangentially to the reel recess 44 with which it is associated, between the reel recess and the adjacent side wall 32 of the base 12. The passage 80 terminates in a generally rectangular opening 82 in the side wall 32 of the base 12. Because the illustrated case 10 has four reels 16, there are four passages 80 and four openings 82.

The strap guide portions on the base 12 also include triangular ribs 84. The ribs 84 are located within the passages 80, one in each passage, slightly inward from the openings 82 in the side walls 32 of the base 12. Each rib 84 has a guide surface 86 that is uppermost on the rib when the case 10 is laid flat on the bottom wall 30. The guide surface 86 extends at an angle to the plane of the bottom wall 30, as can be seen in FIGS. 5 and 6, for example.

Figure 2:
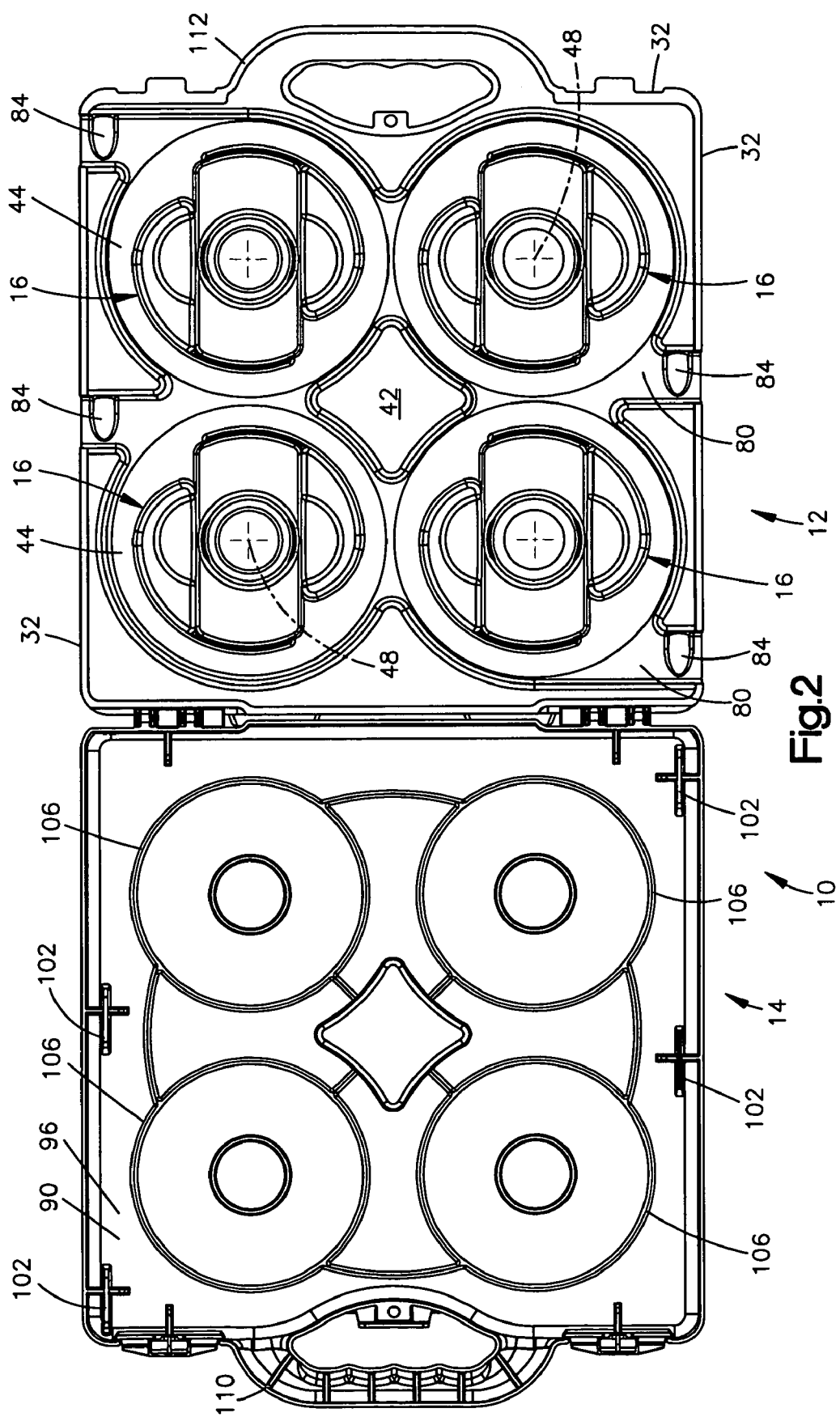
FIG. 2 is a top plan view of the case of FIG. 1, shown in an open condition, having a lid hingedly connected to a base.

The lid 14 of the case 10 has a rectangular top wall 90 and four side walls 92. The lid 14 is shown as being permanently connected to the base 12, although it need not be. In the illustrated embodiment, the lid 14 is hingedly connected to the base 12, with two hinges 94, for pivotal movement relative to the base between an open position as shown in FIG. 2 and a closed position as shown in FIG. 1.

The top wall 90 of the lid 14 is generally planar although it need not be so. The top wall 90 has an inner major side surface 96 and an outer major side surface 98. The outer major side surface 98 is adapted to serve as a retail display surface for displaying point of sale information, such as product information and pricing, for example, in the form of a large sticker 100 (FIG. 1) that is visible when the case 10 is stood upright on a retail store shelf.

The top wall 90 of the lid 14 has guide portions that cooperate with the guide portions of the base 12 to guide the straps 22 as they are being wound on the reels 16. In the illustrated embodiment, the lid guide portions are ribs 102 that project inward from the inner side surface 96 of the top wall 90, at locations that are, when the lid 12 is closed, adjacent to the openings 82 in the base side walls 32, and adjacent to the base ribs 84. Each rib 102 has an angled guide surface 104 that is presented toward the bottom wall 30 of the base 12 when the lid 14 is closed.

The lid 14 has a plurality of circular flanges 106 on the inner major side surface 96 of the top wall 90. The flanges 106 are equal in number to the reels 16. The flanges 106 are positioned on the top wall 90 so that they are concentric with the reels 16 when the lid 14 is in the closed position. The flanges 106 all have the same diameter that is selected to be about the diameter of the strap winding 24 when one layer of strap 22 is wound on the reel 16.

The lid 14 has a handle portion 10 that engages and cooperates with a handle portion 112 on the base 12 to form a handle 114 when the lid is closed. The handle 114 can be used to lift and transport the case 10 and, when the case has straps 22 in it, up to four straps.

To use the case 10, to wind and store ratchet tie-downs 18 that need to be wound for storage, the user first opens the lid 14. The user places the ratchet assembly 20 of a ratchet tie-down 18 in the compartment 73 in the interior of the reel 16, as shown in dashed lines in FIG. 7. The second hook, which is on one end of the strap 22, is also placed in the reel, as shown in dashed lines in FIG. 7.

The user extends the free end of the strap 22 out of the interior of the reel 16, through one of the openings between the wall portions 72. The strap 22 is extended out of the case 10 through the guide passage 80 and through the opening 82 in the side wall 32 of the base 12. In this condition, the strap 22 overlies the rib 84 on the base 20, and engages the upper guide surface 86 on the rib. The strap 22 as it leaves the reel 16 is vertical, but as it passes over the rib 84, it is twisted to lie at the angle of the rib guide surface 86.

The lid 14 is then moved from the open position to the closed position. As this movement occurs, the circular flanges 106 on the inner side surface 96 of the top wall 90 of the lid 14 move into a position adjacent to and overlying the reels 16. The top wall 90 of the lid 14 is generally parallel to the bottom wall 30 of the base 12.

The guide ribs 102 on the lid 14 move into the guide passages 80 in the base 20, adjacent to the guide ribs 84 on the base. At each reel 16, the lid guide rib 102 and the base guide rib 84 cooperate to capture or trap between them the strap 22. The strap 22 thus extends through the opening 82 in the side wall 32 of the base 20, between the two ribs 84 and 102, and along the guide passage 80 in the base 20 to the reel recess 44.

The portion of the strap 22 that is located between the two ribs 84 and 102 extends at an angle to the plane of the top wall 90 of the lid 14 and the bottom wall 30 of the base 12 The portion of the strap 22 that is outside the case 10 can be flat (parallel to the top wall 90 and bottom wall 30), or in any other orientation; but as the strap 22 is drawn into the case by of rotation of the reel 16, the ribs 84 and 102 place it in an angled condition as shown, for example, in FIG. 6. Capturing the strap 22 between the ribs 84 and 102 helps to ensure that the strap is wound correctly on the reel 16 without twists. The guide portions of the case 10 thus help to position the strap 22 for being wound on the reel 16, where it is oriented vertically, that is, generally perpendicular to the top wall 90 and bottom wall 30 of the case 10.

Sufficient rotation of the reel 16 causes the strap 22 to be fully wound on the reel. The strap 22 then does not extend out of the case through the opening 82. As a result, the strap 22 (and up to three others) is completely protected within the case 10. The wound straps 22 can be easily stored and transported in the case 10 when the lid is closed. It should be noted that as the main gear 52 is rotated about the central axis 40, all four reels 16 rotate simultaneously about their individual reel axes, and thus all four straps 22 (or up to four, or up to the number of reels) can be wound at once.

The configuration of the guide portions of the case also helps to save space in the case. Specifically, one factor in determining the minimum height of the case 10 (from the top wall 90 to the bottom wall 30) is the space needed at the area of the outside walls 32 and 92 to accommodate the strap 22 as it enters the case during winding. As shown in FIG. 6, for example, the opening 82 in the base side wall 32, as exposed when the lid 14 is closed, has a height marked by the distance "H". This distance H is less than the width W of the strap. Were the strap 22 to be guided vertically into the case 10, the case 10 would have to be taller. Guiding the strap 22 into the case 10 at an angle like this makes it possible to reduce the height of the case.

As a result, the case 10 is well adapted to be used for display and sale as well as for winding and storage. Most retailers' shelves are fourteen inches in depth. In one embodiment, the case 10 is short enough (three and a half inches) for a one-inch wide strap 22 so that four cases can be placed on one shelf.

FIGS. 8–10 illustrate a spool winder, or case, 120 that is a second embodiment of the invention. The case 120, like the case 10, is adapted to wind, store and display one or a plurality of straps 22 at one time. In the case, however, all straps 22 are wound about one common axis.

Specifically, a base portion 122 of the case 120 supports a removable spool 124 that includes a plurality of individual reels 126 on a single axle rotatable on the base portion 122. The spool 124 can be formed as one piece including the reels 126 and the axle, if desired. Each reel 126 has a reel axis 130 about which it is rotatable; because the reels are joined together to form the spool 124, the reel axes are in common to form one common axis 130.

The case 120 includes a rotation mechanism for rotating the spool 124. The rotation mechanism includes a knob or handle 132 on a disc 134. The disc 134 is fixed for rotation with the spool 124, or may be geared to the spool or otherwise connected so that moving the knob 132 causes the spool to rotate to wind the straps 22.

Each reel 126 includes a slot 136 for receiving the second hook, that is on one end portion of the strap 22 of a ratchet tie-down 16. Adjacent to the spool 124 the base portion 122 of the case 120 has a plurality of compartments 138 for receiving and storing the ratchet assembly 20 of the ratchet tie-downs 18. The front edge of the base portion 124 has a series of slots or notches 140 formed in its upper edge 142.

The case 120 also includes a lid 144 that is hinged to the base 122. The lid 144 has a front lip 146 that is disposed adjacent to the upper edge 142 of the base 122 when the lid is closed. The lid 144 also has an exterior major side surface 148 for holding retail information. The lid 144 can be moved to an open position as shown in FIG. 9 to enable removal of the tie-downs 16 from the case 120.

To use the case 120, to wind and store ratchet tie-downs 16 that are unwound, the user first opens the lid 144. The user places the ratchet assembly 20 of a ratchet tie-down 16 in one of the compartments 138 of the base 122, as shown in FIG. 9. The second hook, which is on one end of the strap 22, is placed sideways in the slot 136 in the reel 126.

The user extends the free end of the strap 22 out of the interior of the base 122, and rests it in one of the notches 140 in the upper edge 142 of the base. The lid 144 is then moved from the open position to the closed position. As this movement occurs, the lip 146 on the lid 144 moves into a position adjacent the to the notches 140 on the base 122. At each reel 126, the lip 146 and the notch 140 cooperate to capture or trap between them the strap 22.

Sufficient rotation of the spool 124 causes the strap 22 to be fully wound on the reel 126. The strap 22 then does not extend out of the case 120. As a result, the strap 22 is completely protected within the case 120. The wound straps 22 can be easily stored and transported in the case 120. It should be noted that as the spool 124 is rotated, all reels 126 rotate simultaneously about the same axis 130, and thus all straps 22 can be wound at one time.

Figure 11:
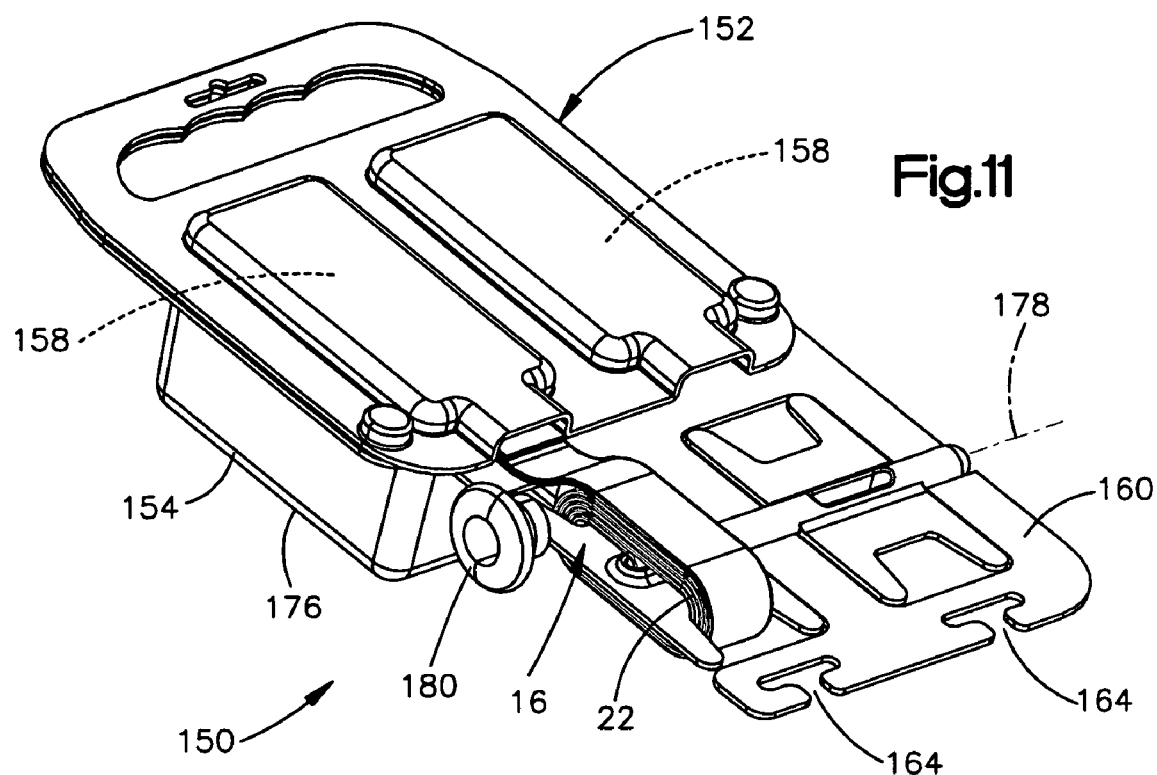
FIG. 11 is a perspective view of a case in the form of a board winder that is a third embodiment of the invention, shown in a closed condition.
Figure 12:
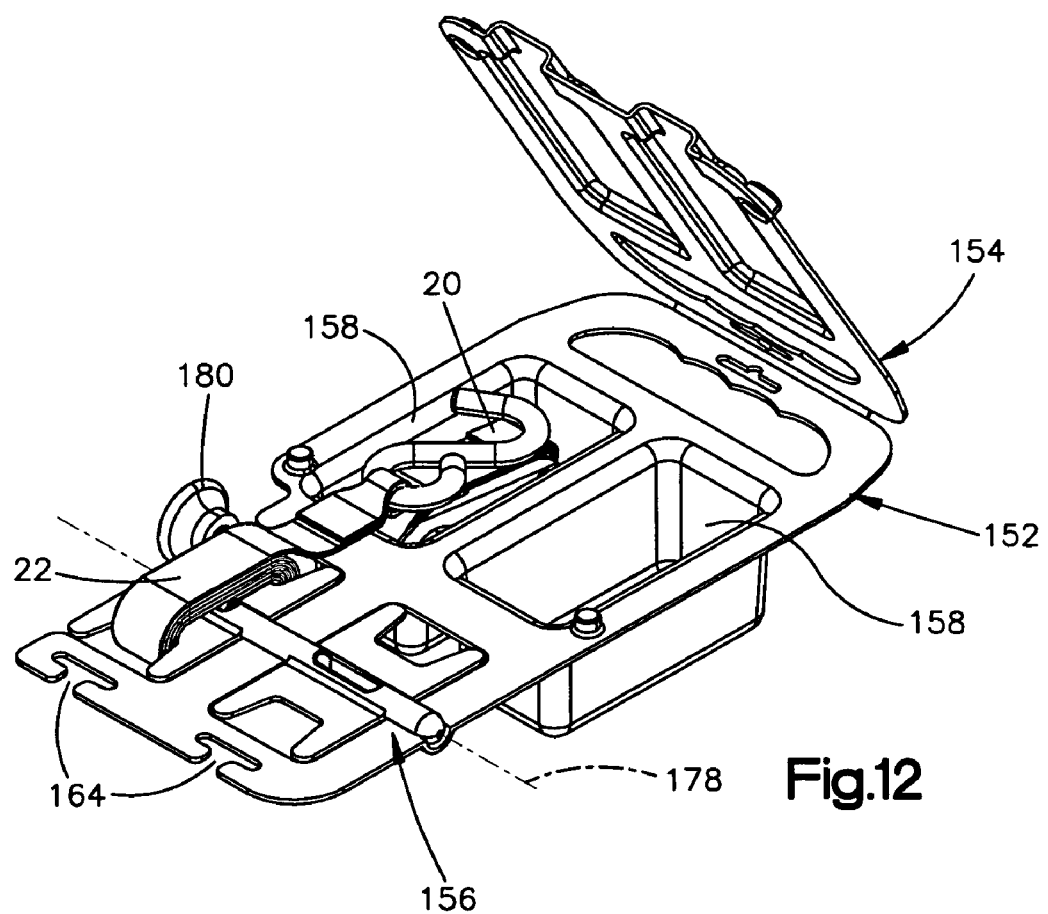
FIG. 12 is a view showing the case of FIG. 11 in an open condition with one ratchet tie-down therein.
Figure 13:
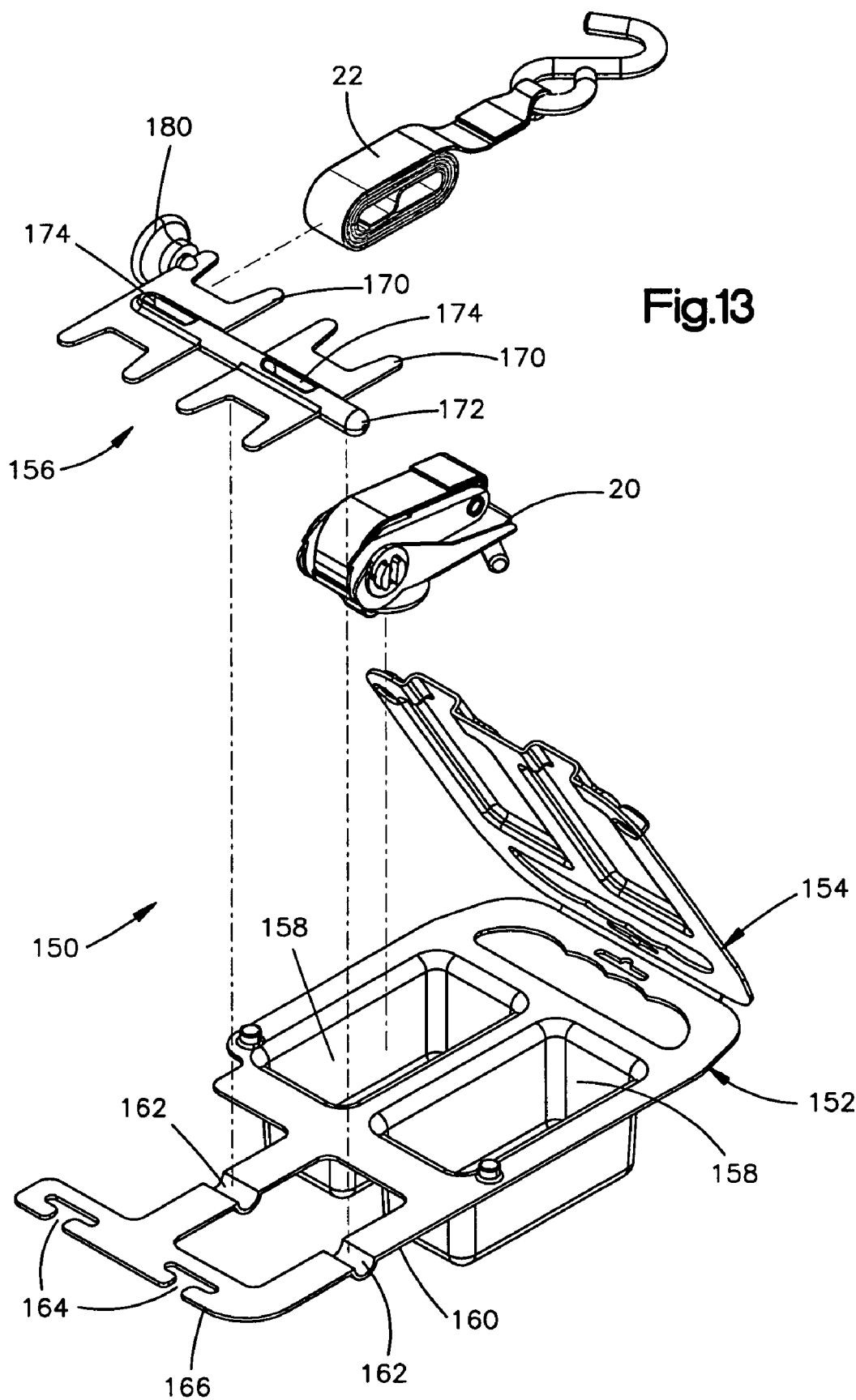
FIG. 13 is an exploded perspective view of the parts of the case of FIG. 11.

FIGS. 11–13 illustrate a board winder, or case, 150 that is a third embodiment of the invention. The case 150, like the case 10, is adapted to wind, store and display one or a plurality of straps 22 at one time. In the case 150, however, all straps 22 are wound about one common axis and remain at least partially exposed when wound.

Specifically, the case 150 includes a base 152, a lid 154, and a spool 156 in the form of a paddle wheel. The base 150 has two compartments 158 for storing the ratchet assemblies 20 of two ratchet tie-downs 16. (A board winder 150 of this type can alternatively be configured to wind and store a different number of tie-downs.) A planar support portion 160 of the base 152 projects from the compartments 158. The support portion 160 has arcuate grooves 162 for supporting the spool 156 for rotation on the base 152. The support portion 160 also has two T openings 164 at its outer edge 166.

The spool 156 has two paddles or reels 170 supported on an axle 172. The spool 156 is preferably formed as one piece. The axle 172 has two slots 174, at the location of the reels 170, adapted to receive end portions of straps 22 to be wound. The lid 154 has an exterior major side surface 176 for holding retail information.

When the case 150 is to be used to store a ratchet tie-down 16, the ratchet assembly of the ratchet tie-down is placed in a compartment 158. Then, the free end of the strap 22 is inserted into a slot 174 in the axle 172 of the spool 156. The spool 156 is placed in the grooves 162 in the support portion 160 of the base 152. The grooves 162 are configured to enable the axle 172 to snap into the grooves, so that the axle is then fixed on the base 152 for rotation relative to the base. The axle 172 rotates on an axis 178 that is a common reel axis for the two reels 170.

The strap 22 is then fed through a T opening 164 in the outer edge 166 of the support portion 160 of the base 152. The T opening 164 helps to align and guide the strap 22 as it is being wound. The reel 170 is then rotated by turning a knob 180 on the spool 156. When the strap 22 is almost fully wound on the reel 170, the second hook (on the end of the strap 22) is placed in the compartment 158, on top of the first hook and the ratchet. The lid 154 is then snapped closed on the base 152, to help retain the hooks and the ratchet in the compartment 158. The lid 154 can be moved to an open position as shown in FIG. 12 to enable removal of the tie-downs 16 from the case 150.

From the above description of the invention, those skilled in the art will perceive improvements, changes, and modifications in the invention. Such improvements, changes, and modifications within the skill of the art are intended to be included within the scope of the appended claims.

Having described the invention, we claim:

1. A case for storing and winding a plurality of ratchet tie-downs each having a first part and having a second part, the second part of each tie-down including a strap having a hook at one end, the tie-downs being removable from the case for use, the case comprising:
   a base;
   a plurality of reels each reel having a compartment for storing the first parts of the tie downs and supported on the base for rotation relative to the base, each reel having a winding portion for winding the strap on the reel upon rotation of the reel;
   a rotation mechanism for simultaneously rotating all the reels on the base in a winding direction relative to the base thereby to wind the straps onto the reels; and
   a lid for the case, the lid when in a closed position helping to retain the straps in the case, the lid also having an open position relative to the base for enabling removal of the straps from the reels;
   the case having a closed configuration adapted for placement on a retail store shelf and the lid having an exterior major side surface for holding retail information.

2. A case as set forth in claim 1 wherein the each reel has a reel gear and wherein the rotation mechanism includes a main gear that meshes with all the reel gears thereby to cause rotation of the reels in response to rotation of the main gear.

3. A case as set forth in claim 1 wherein the case also has a carrying handle comprising a handle portion on the base and a handle portion on the lid that come together to form the handle of the case.

4. A case as set forth in claim 1 wherein the rotation mechanism is operative to rotate all of the reels in a winding direction regardless of whether a strap is being wound on each reel.

5. A case as set forth in claim 4 wherein the plurality of reels includes exactly four reels.

6. A case as set forth in claim 1 including strap guide portions for controlling and guiding the straps onto the reels during winding.

7. A case as set forth in claim 6 wherein the strap guide portions include portions on the lid and the base that force the strap into a narrow space to cause the strap to assume a particular alignment with regard to the reel.

8. A case for winding a plurality of straps that are removable from the case for use, the case comprising:
   a base;
   a plurality of reels supported on the base for rotation relative to the base about respective reel axes, each reel having a receiving portion for receiving an end portion of a strap and having a winding portion for winding the strap on the reel upon rotation of the reel about its axis, each reel also having a reel gear;
   a main gear supported on the base for rotation relative to the base about a main gear axis separate from the reel axes, the main gear being in meshing engagement with the reel gears; and
   a manually engageable handle connected with the main gear for transmitting rotational force to the main gear thereby to cause rotation of the reels about their reel axes.

9. A case as set forth in claim 8 further including a lid for the base, the lid having an open position relative to the base for enabling removal of the straps from the reels, the lid having a closed position relative to the base in which guide portions of the lid are disposed adjacent to and cooperate with guide portions of the base to guide the straps onto the winding portions of the reels as the reels are being rotated about the reel axes.

10. A case as set forth in claim 9 wherein the base guide portions include guide passages through which the straps are extensible, the guide passages terminating in openings and being associated in a one to one relationship with the reels, the base guide portions also including base guide ribs in the passages.

11. A case as set forth in claim 10 wherein the lid has a main body portion and wherein the lid guide portions include ribs that project from the main body portion into the guide passages in the base when the lid is closed, the lid guide ribs and the base guide ribs cooperating to guide the straps onto the winding portions of the reels as the reels are being rotated about the reel axes.

12. A case as set forth in claim 11 wherein the base guide ribs and the lid guide ribs cooperate to guide the straps between them at an angle relative to the central axis thereby to twist the straps being wound.

13. A case as set forth in claim 8 wherein rotation of the main gear causes simultaneous rotation of all the reels on the base.

14. A case as set forth in claim 8 wherein the reels include a plurality of compartments associated one with each reel for storing ratchet assemblies associated with the straps.

15. A case for winding a plurality of straps that are removable from the case for use, the case comprising:
   a base;
   a plurality of reels supported on the base for rotation relative to the base about respective reel axes, each reel receiving an end portion of a strap and having a winding portion for winding the strap on the reel upon rotation of the reel about its axis;
   a mechanism for simultaneously rotating all the reels on the base thereby to wind the straps onto the reels; and
   a lid for the base, the lid having an open position relative to the base for removing the straps from the reels, the lid having a closed position relative to the base in which guide portions of the lid are disposed adjacent to and cooperate with guide portions of the base to guide the straps onto the winding portions of the reels as the reels are being rotated about the reel axes.

* * * * *